(12) United States Patent
Reay et al.

(10) Patent No.: US 6,470,745 B1
(45) Date of Patent: Oct. 29, 2002

(54) DISPENSERS FOR POWDERED BABY MILK

(76) Inventors: Gavin Reay, 37 Poyntz Road, London SW11 5BH (GB); Simon David Heap, 61 Hamilton Road, Twickenham, Middlesex TW2 6SN (GB)

( * ) Notice: Subject to any disclaimer, the term of this patent is extended or adjusted under 35 U.S.C. 154(b) by 16 days.

(21) Appl. No.: 09/591,558

(22) Filed: Jun. 8, 2000

(51) Int. Cl.[7] .......................... G01F 19/00; G01D 13/00; G01D 13/12; G01D 13/22

(52) U.S. Cl. ........................... 73/426; 73/429; 116/284; 116/298; 116/303

(58) Field of Search .......................... 73/427, 426, 429; 116/284, 84, 292, 298, 303, 309, 307, 313, 318; 33/524; 30/324

(56) References Cited

U.S. PATENT DOCUMENTS

| | | | | |
|---|---|---|---|---|
| 464,393 A | * | 12/1891 | Scheid | |
| 1,249,017 A | * | 12/1917 | Brunkhurst | |
| 2,042,945 A | * | 6/1936 | Lemay | 73/62 |
| 2,259,504 A | * | 10/1941 | Wilson et al. | 73/165 |
| 2,459,466 A | * | 1/1949 | Spreen | 73/426 |
| 4,283,951 A | * | 8/1981 | Varpio | 73/426 |
| 5,482,030 A | * | 1/1996 | Klein | 128/200.23 |
| 5,884,523 A | * | 3/1999 | Cheng et al. | 73/426 |

FOREIGN PATENT DOCUMENTS

GB  2 310 196  8/1997

* cited by examiner

Primary Examiner—Benjamin R. Fuller
Assistant Examiner—Lilybett Martir
(74) Attorney, Agent, or Firm—Christie, Parker & Hale, LLP

(57) ABSTRACT

A dispensing spoon comprising a handle, a scoop having an open mouth formed at one end of the handle, a powder leveling means in the form of a wiper part which is coupled integrally and flexibly to an opposite end of the handle remote from the scoop and which can be displaced manually in a sweep plane so as to sweep laterally over the mouth of the scoop for powder leveling purposes, and a counter which is automatically advanced by operation of the powder leveling means. The counter includes a counter disc having a plurality of numbers around its surface and is arranged to be indexed by one number when the wiper part is displaced to sweep over the scoop mouth to perform a powder leveling operation. The counter disk is journalled on the wiper part or the handle for rotation in a plane parallel to the sweep plane of the wiper part so that the numbers are displayed upwardly. The counter disc has on its underside a ratchet wheel having a plurality of teeth. The handle part has a laterally flexible pusher member which is positioned to engage and advance the ratchet wheel, and hence the counter disc, by one digit when the wiper part is displaced relative to the handle to perform a powder leveling action. The wiper part has a laterally flexible ratchet member which engages the ratchet wheel to control its rotation.

11 Claims, 3 Drawing Sheets

DISPENSERS FOR POWDERED BABY MILK

The present invention relates to powder dispensers and is concerned in particular with powdered baby milk dispensing spoons.

The conventional practice is for manufacturers of powdered baby milk to supply within the packaging box/tin/packet for the powdered baby milk, a plastics milk/powder dispensing spoon. Such spoons usually comprise a flat handle coupled to one end to a generally hemispherical or cylindrical scoop. In use, the spoon is inserted into the mass of powder such that the scoop is overfilled, ie. the mass of powder extends above the level of the mouth of the scoop when the spoon is held horizontally. A convenient edge, usually a knife edge, is then run along the handle and over the mouth of the scoop so as to remove the excess powder and leave the scoop filled exactly to the brim. The spoon is then inverted over the feeling bottle and, if necessary, tapped on the rim, so as to allow the powder to fall into the bottle. This procedure is repeated as necessary, for example up to five times, so as to introduce the correct amount of powdered milk into the feeding bottle.

One practical problem associated with the conventional spoon is therefore that it relies on the user having an appropriate knife edge handy when milk powder is to be dispersed.

A second practical problem is that the use of the known spoon requires the user to have two hands free, one to hold the spoon and the other to hold and manipulate the knife edge for removing the excess powder from the scoop necessary to be sure of accurately dispensing "one scoopful". It would often be very useful if the spoon could dispense using one hand only; this would enable the other hand/arm to be used for a completely different purpose, for example to hold the baby.

The latter problems can be overcome by using a dispensing spoon as described in our earlier UK Application No. GB-A-2331289 which comprises a handle having a scoop at one end and a powder levelling means coupled to the handle which can be displaced manually for levelling off the scoop contents.

In some embodiments described in GB-A-2331289, the powder levelling means may be adapted to be pivotally mounted on the handle so that it can sweep over the mouth of the scoop for levelling purposes. For example, the handle can be generally elongate and flat and the powder levelling means can comprise a blade device which is pivotally mounted on the handle adjacent its end opposite to the scoop so as to be capable of sweeping over the mouth of the scoop in a plane generally parallel to the handle.

In other embodiments, the powder levelling means may be flexibly coupled to the end of the handle remote from the scoop such that the levelling means can sweep over the mouth of the scoop for levelling purposes. The levelling means in this case may be formed integrally with the handle and have a portion which normally lies to one side of the scoop mouth but which, by virtue of said flexible coupling with the handle, can be displaced relative to the handle so as to sweep over the scoop mouth for levelling purposes. A similar levelling arrangement is known also from GB-A-2310196.

A practical problem with all of the latter spoons is that the user still has to remember how many spoonfuls have been dispensed. This can be particularly difficult if the dispensing operation is interrupted for some reason, as often happens when attending to young babies, and one has to remember how many spoonfuls have already been dispensed when the bottle filling operation is resumed.

It has already been proposed to provide a counter on the spoon in the form of a finger-operated counting wheel. The intention is that one manually moves the counter on one digit each time a spoonful is dispensed. This, however, still has the disadvantages that one has to remember to operate the wheel each time.

It has also been proposed already in U.S. Pat. No. 5,884,523 to provide a scoop having a counter which is indexed automatically each time a levelling operation of the spoon is performed. The scoop of U.S. Pat. No. 5,884,523 comprises a scooping cup with a handle and a pusher that can slide to and fro longitudinally on the handle of the scoop. On the front end of the pusher there is provided a cover ring and on the rear end of the pusher is a top plate. At the end of the handle of the scooping cup is fitted a housing that comprises a left casing and a right casing. On each casing there is a window and inside the casing is fitted a counter ratchet. A digit frame in a ring arrangement is attached to both sides of the counter ratchet. On the lower part of the housing is an opening so a toothed side of the counter ratchet is exposed to facilitate resetting adjustment. Also in the housing and at the toothed side of the counter ratchet is a flexible fixing plate to fix the counter ratchet. In operation, the pusher is slid across the scooping cup so that where the cover ring at the front end of the pusher levels the powder material in the scooping cup to obtain a constant quantity of powder material. When the pusher is slid back, the top plate at the rear of the pusher pushes and turns the counter ratchet which then turns the next digital of the digit frame.

One practical problem with the scoop of U.S. Pat. No. 5,884,523 is that the counter can only be read from below and must therefore be inverted to enable the current count to be observed. In practice, it would be advantageous to be able to read the counter when the scoop was full. The scoop of U.S. Pat. No. 5,884,523 is also relatively complex construction and it would be advantageous for a simpler construction to be available in order to keep down the cost of what is often a "give-away" product where minimal cost is essential.

It has also been proposed already in our own UK Patent Application No. GB-A-2331979 to provide a scoop/spoon having a counter which can be read from above the spoon and which is advanced each time that a levelling operation of the spoon is performed. In GB-A-2331979 it was envisaged that, where the powder levelling means comprises a wiper part adapted to be swept over a month part of the scoop, the counter would comprise a counter wheel carrying a plurality of numbers, the counter wheel being arranged to be rotated by an angular distance corresponding to one number when the wiper part is moved towards the scoop month. The counter wheel would be operated by a ratchet arrangement whereby it is angularly advanced when the wiper part is moved towards the scoop mouth but is not moved when the wiper part is moved away from the scoop mouth, the counter wheel being journalled on the handle part of the spoon and being adapted to be engaged and actuated by a projection on the wiper part when the wiper part is moved towards the levelled off condition.

However, it has proven to be difficult to make the latter mechanism work in practice and it has been realised that it would be preferable mechanically for the counter to be carried by the wiper part rather than by the handle. A first objective is therefore to achieve such a arrangement.

A second objective of the present invention is to provide a more effective means of achieving a scoop with a built-in counter which is of simplified construction compared to the scoop of U.S. Pat. No. 5,884,523 and which enables the counter to be read from above with the scoop full.

In accordance with the present invention, there is provided a dispensing spoon comprising a handle, a scoop having an open mouth formed at one end of the handle, a powder levelling means in the form of a wiper part which is coupled integrally and flexibly to an opposite end of the handle remote from the scoop and which can be displaced manually in a sweep plane so as to sweep laterally over the mouth of the scoop for powder levelling purposes, and a counter which is automatically advanced by operation of the powder levelling means, the counter including a counter disc carrying a plurality of numbers around its surface and being arranged to be indexed to a next number when the wiper part is displaced to sweep over the scoop mouth to perform a powder levelling operation, wherein the counter disc is journelled on one of the wiper part and handle for rotation in a plane parallel to the sweep plane of the wiper part so that the numbers are displayed upwardly in an orientation of the spoon where the open mouth itself faces upwardly.

Preferably, the counter discs is journalled on the wiper part and carries on its underside a ratchet wheel having a plurality of teeth, the handle part carrying a laterally flexible pusher member which is positioned to engage and advance the ratchet wheel, and hence the counted disc, by one digit when the wiper part is displaced relative to the handle to perform a powder levelling action, and the wiper part carrying a laterally flexible ratchet member which engages the ratchet part to control its rotation.

Advantageously, the counter includes a base portion formed integrally with the wiper part and has a recess within which said counter disc is received, there being disposed within said recess a plurality of upstanding flexible lugs which together define a journal bearing for the counter wheel.

Preferably, the open mouth of the scoop is circular and the wiper part includes a substantially semi-circular portion which normally lies closely to one side of said open mouth but which, by virtue of said flexible coupling with the handle, can be displaced angularly relative to the handle so as to sweep over the mouth for powder levelling purposes.

Preferably, the spoon includes an upstanding fixed spigot on the handle which engages normally with the wiper part, when the wiper part is non-actuated, to hold the wiper part in a position where said semi-circular portion lies closely to one side of said open mouth.

The invention is described further hereafter, by way of example only, with reference to the accompanying drawings, in which:

FIG. 1 is a perspective, partially sectioned view from above of an embodiment of a powder dispensing spoon in accordance with the present invention in a non-operational explanatory configuration with a counter wheel removed from its operational position;

FIG. 2 corresponds to FIG. 1 but with counter wheel in its operational position;

Figure 1:
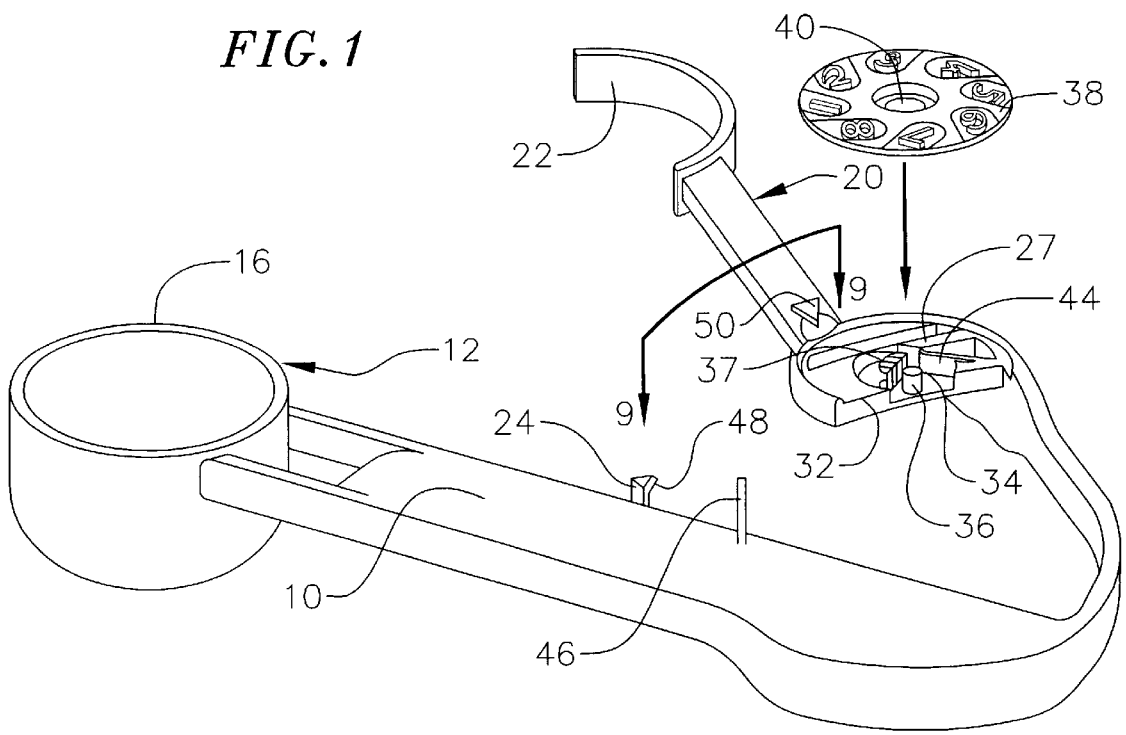
Figure 2:
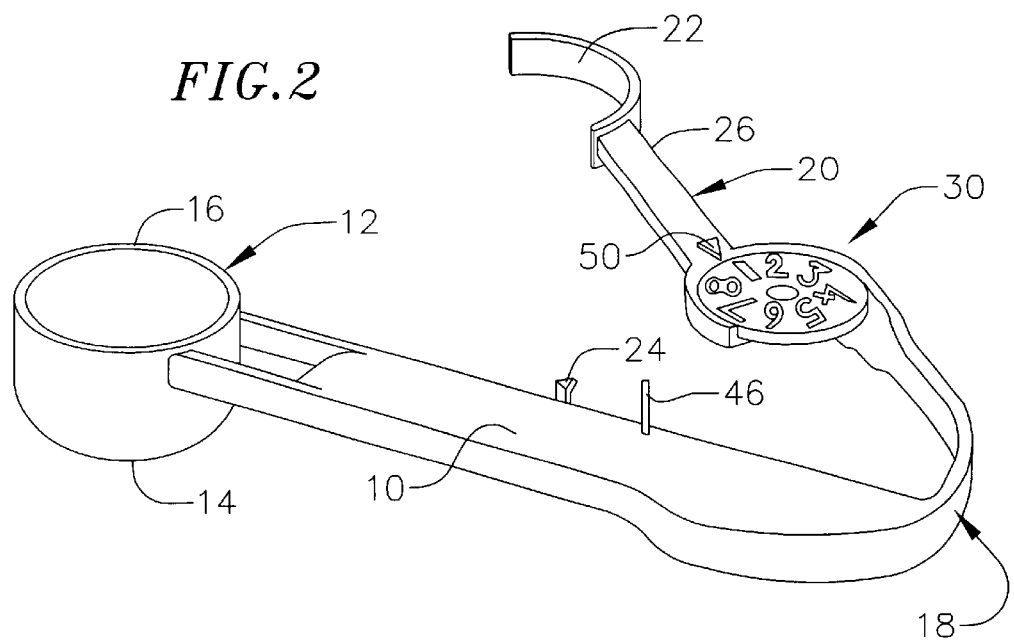
Figure 3:
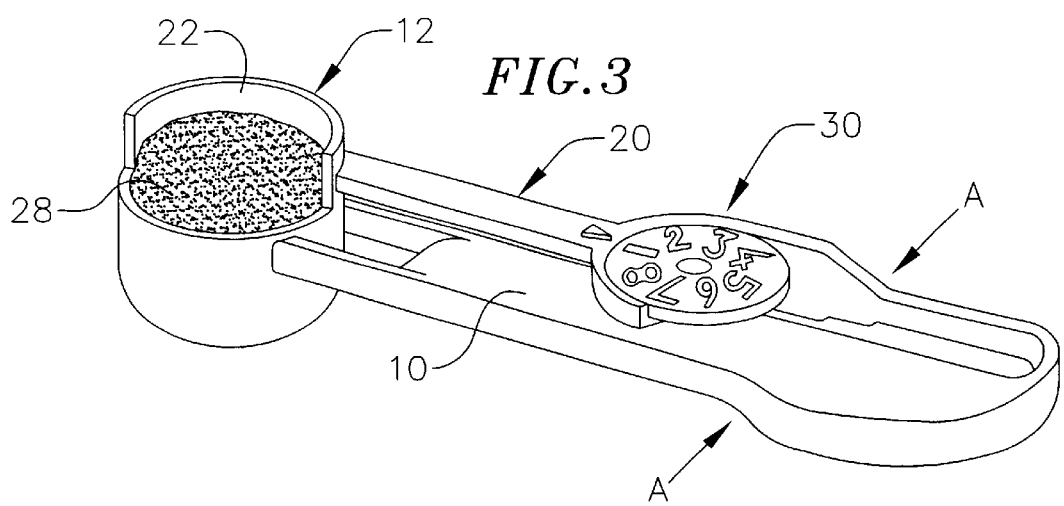
FIG. 3 is a perspective view of the spoon of FIGS. 1 and 2 in an operational configuration and with the scoop part of the spoon overfilled with powder.
Figure 4:
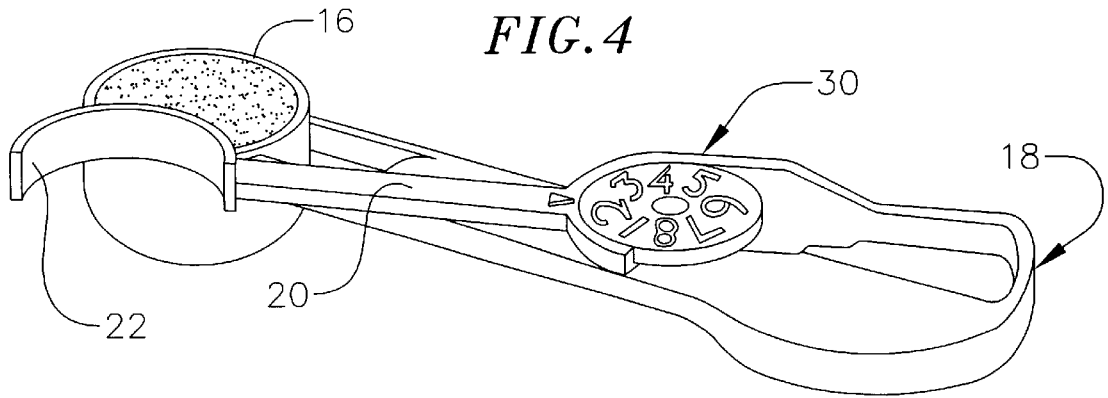
FIG. 4 is a perspective view of the spoon of FIGS. 1 and 2 with the powder levelling means having been operated to level the powder contents in the scoop part.

The powder dispensing spoon of FIGS. 1 to 4 comprises a flat handle portion 10 integrally moulded with a scoop portion 12 of generally cylindrical configuration, having a closed end 14 and a circular open mouth 16. Integrally connected to the handle portion 10, at the end remote from the scoop portion 12, via a flexible coupling portion 18 is a wiper arm 20 which carries at its free end a substantially semi-circular, upstanding wall portion 22 which is constrained to lie normally in vertical alignment with the cylindrical wall portion of the scoop, as shown in FIG. 3, by means of the engagement of an upstanding lug 24 on the handle part 10 with a slot 27 in the wiper part 20. FIGS. 1 and 2 show for illustration purposes a position the handle part may adopt when removed from the constraining action of the lug 24. The lug 24 thus serves to limit the angular range of movement of the wiper part 20 necessary for operation of the spoon to that between the positions shown in FIGS. 3 and 4 as described hereinafter.

In use, the spoon is thus initially in the configuration as shown in FIG. 3 and is inserted into a powdered milk container (not shown) so as to pick up a quantity of milk powder 28 which overfills the scoop 12 as shown in FIG. 3. Finger pressure is then applied to the wiper part 20 by squeezing the handle and wiper part together as indicated by the arrows A in FIG. 3 so that the connecting portion 18 flexes and enables the semi-cylindrical wall portion 22 to sweep across the mouth 16 of the scoop to the position shown in FIG. 4 to remove excess milk powder and level off the scoop.

When the finger pressure is relaxed the wiper arm 20 returns to the FIG. 3 condition and the contents of the precisely full scoop can be tipped out for preparation of the milk feed. It will be appreciated that this spoon filling and levelling action can easily be achieved with one hand.

As described hereinafter, the aforegoing basic levelling action of the wiper part is also arranged automatically to advance a counter mechanism 30, the details of which are best seen in the cutaway views of FIGS. 1 and 5 to 8.

With reference first to FIG. 1, there is integrally formed in the wiper part 20 a generally circular, generally planer counter base portion 32, roughly half of which has been cut away in FIG. 1 for illustration purposes.

Disposed in a central recess 34 in the counter base 30 is a group of four upstanding springy barbed tags 36 which together constitute a bearing for a circular numbered wheel 36 having a central hole 40 which engages over the tags 36 and is held rotatably in place by the respective barbs 37 on the ends of the tags 36. Integrally moulded with, or rigidly attached to, the underside of the wheel 38 and received in the recess 34 is a ratchet part 40 having the same number of ratchet teeth 42 as there are numbers on the wheel, eight in this case. Projecting from the counter base 32 and within the recess 34 is a laterally flexible, ratchet arm 44 and projecting from the handle part 10 is a laterally flexible push arm 46. The parts 44 and 46 can be formed integrally with the wiper part and handle part, respectively.

Figure 9:
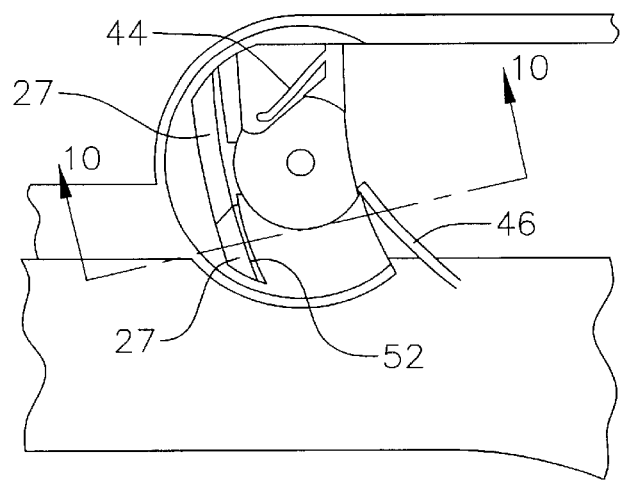
FIG. 9 is a partial plan view of the counter arrangement with the counter disc removed.
Figure 10:
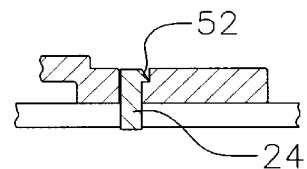
FIG. 10 is a section on A—A in FIG. 9.

In order to ensure that the wall portion 22 remains at all times in sliding contact with the mouth 16 of the scoop, the upstanding lug 24 has a turned-over lip 52 on its free end which engages over and slides on the wiper part on one side of the slot 27, underneath the disc 38, so as to prevent the wiper part from being pushed away from the handle 10 during operation as a result of twisting of the flexible coupling portion 18 (see FIGS. 9 and 10).

With reference to FIGS. 5 to 8, the above described counter operates as follows.

Figure 5:
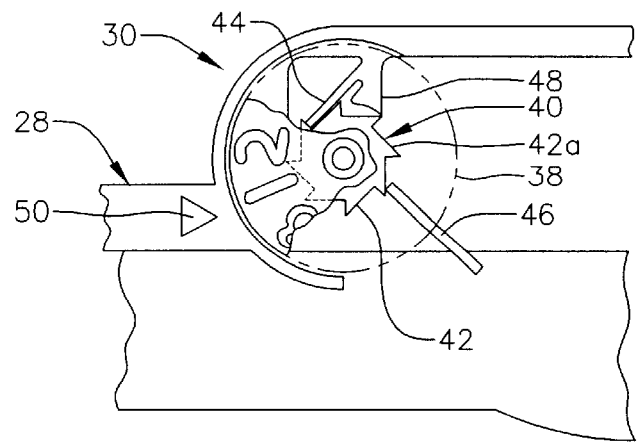
FIGS. 5, 6, 7 and 8 are partial diagrammatic plan views illustrating the operation of the counter arrangement of the spoon of FIGS. 1 to 4.
Figure 6:
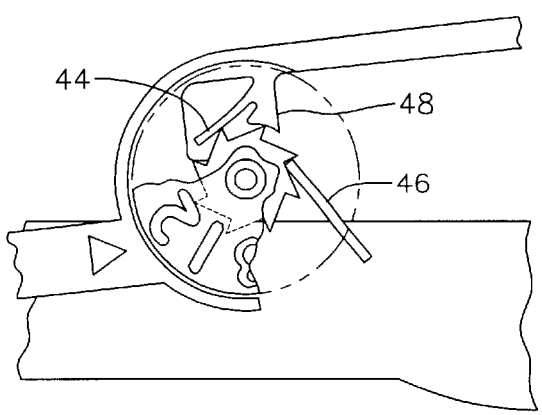
Figure 7:
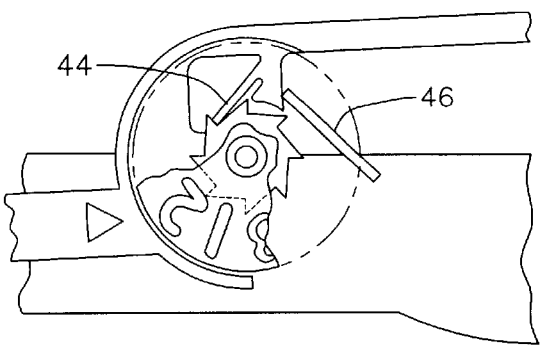
Figure 8:
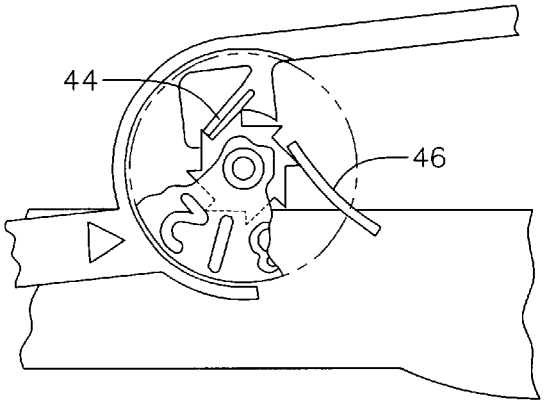

Starting from the condition shown in FIG. 5 (which corresponds to FIG. 3) wherein a pointer 50 on the wiper arm 20 points to a digit "1" on the counter wheel, the wiper arm 20 is urged by finger pressure towards the condition shown in FIG. 7. In the first part of this movement (see FIG. 6), the displacement of the wiper arm 20 brings the ratchet tooth 42a on the underside of the counter wheel 38 into engagement with the free end of the push arm 46 on the handle whereby the counter wheel 38 is caused to be rotated anti-clockwise by a little more than 45° on the bearing formed by the tags 36. As this movement continues, the push arm 46 rides over the tooth 42a by engagement with a surface 48 on the counter base, over-rotation of the counter wheel arising, from inertia being prevented by the ratchet arm 44 being spring biased against the ratchet wheel 40, as shown in FIG. 6. When the then force on the wiper arm 20 is released and this arm is allowed to return to the FIG. 5 condition, the reverse sweep of the arm 20 drags the push arm 46 against the counter wheel as shown in FIG. 8, bringing the wheel back against the ratchet arm 44 and thus bringing the next consecutive digit ('2') on the counter wheel into correct alignment with the pointer 50. The initial position of FIG. 5 is then obtained again but with the counter wheel advances by one digit in relation to the pointer 50. Each further operation of the wiper arm 20 advances the counter wheel by one further digit in the same manner.

Obviously, the intention is that the pointer should be reset to zero by operation of the counter before it is used to perform a series of powder dispersing operations.

By this structure a particularly simple and reliable mechanism is provided for indicating how many dispensing operations have been achieved.

The whole structure is normally constructed from a flexible plastics material whereby the handle, part 10, scoop 12, wiper part 20 and counter base can be moulded in a single process step, only the counter wheel and associated ratchet having to be formed separately.

We claim:

1. A dispensing spoon comprising a handle, a scoop having an open mouth formed at one end of the handle, a powder leveling means in the form of a wiper part which is coupled integrally and flexibly to an opposite end of the handle remote from the scoop and which can be displaced manually in a sweep plane so as to sweep laterally over the mouth of the scoop for powder leveling purposes, and a counter which is automatically advanced by operation of the powder leveling means, the counter including a counter disc carrying a plurality of numbers around its surface and being arranged to be indexed by one number when the wiper part is displaced to sweep over the scoop mouth to perform a powder leveling operation, wherein the counter disc is rotatably mounted on one of the wiper part and handle and rotates in a plane parallel to the sweep plane of the wiper part so that the numbers are displayed upwardly in an orientation of the spoon where the open mouth itself faces upwardly.

2. A dispensing spoon according to claim 1, wherein the counter disc is rotatably mounted on the wiper part and carries on its underside a ratchet wheel having a plurality of teeth, the handle part carrying a laterally flexible pusher member which is positioned to engage and advance the ratchet wheel, and hence the counter disc, by one digit when the wiper part is displaced relative to the handle to perform a powder leveling action, and the wiper part carrying a laterally flexible ratchet member which engages the ratchet wheel to control its rotation.

3. A dispensing spoon according to claim 2, wherein the counter includes a base portion formed integrally within the wiper part and has a recess within which said counter disc is received, there being disposed within said recess a plurality of upstanding flexible lugs which together define a journal bearing for the counter disc.

4. A dispensing spoon according to claim 3, wherein the open mouth of the scoop is circular and the wiper part includes a substantially semi-circular portion which normally lies closely to one side of said open mouth but which, by virtue of said flexible coupling with the handle, can be displaced angularly relative to the handle so as to sweep over the mouth for powder leveling purposes.

5. A dispensing spoon according to claim 2, including an upstanding fixed spigot on the handle which engages normally with the wiper part, when the wiper part is non-actuated, to hold the wiper part in a position where said semi-circular portion lies closely to one side of said open mouth.

6. A dispensing spoon according to claim 5, wherein said upstanding spigot on the handle engages within a slot in the wiper part for guiding and limiting the sweeping displacement of the wiper part relative to the handle.

7. A dispensing spoon according to claim 6, wherein said upstanding spigot has a projection at its free end which engages over and slides on the wiper part so as to ensure that the wiper part remains in sliding contact with the mouth of the scoop during its sweeping movement there across.

8. A dispensing spoon comprising a handle, a scoop having an open mouth formed at one end of the handle, a powder leveling means in the form of a wiper part which is coupled integrally and flexibly to an opposite end of the handle remote from the scoop and which can be displaced manually in a sweep plane so as to sweep laterally over the mouth of the scoop for powder leveling purposes, and a counter which is automatically advanced by operation of the powder leveling means, the counter including a counter disc carrying a plurality of numbers around its surface and being arranged to be indexed by one number when the wiper part is displaced to sweep over the scoop mouth to perform a powder leveling operation, wherein the counter disc is rotatably mounted on one of the wiper part and handle and rotates in a plane parallel to the sweep plane of the wiper part so that the numbers are displayed upwardly in an orientation of the spoon where the open mouth itself faces upwardly and wherein a projecting member is provided on one of the handle and wiper parts which extends through an aperture in the other of the handle and wiper parts and slidingly engages with said other of the handle and wiper parts to maintain the wiper part in sliding contact with the mouth of the scoop during displacement of the wiper part for powder leveling purposes.

9. A dispensing spoon comprising:
  a handle;
  a scoop having an open mouth and extending from the handle;
  a wiper extending from the handle for sweeping along a sweeping plane laterally across the scoop open mouth; and
  a counter indicator rotatably coupled to one of said handle and wiper about an axis generally perpendicular to the sweeping plane, said counter indicator having a plurality of numbers on said counter outer surface, and wherein the counter rotates to advance one of said plurality of numbers when said wiper sweeps across the scoop open mouth.

10. A dispensing spoon according to claim 9 wherein the wiper is integral with the handle.

11. A dispensing spoon according to claim 10 wherein the handle has a length and wherein said wiper sweeps across the scoop open mouth and transversely to said length.

* * * * *